United States Patent [19]

Edamura

[11] Patent Number: 5,408,340
[45] Date of Patent: Apr. 18, 1995

[54] FACSIMILE TRANSMISSION CONTROL METHOD

[75] Inventor: Toshiaki Edamura, Atsugi, Japan

[73] Assignee: Ricoh Company, Ltd., Tokyo, Japan

[21] Appl. No.: 107,300

[22] Filed: Aug. 17, 1993

[30] Foreign Application Priority Data

Aug. 18, 1992 [JP] Japan .................. 4-218878

[51] Int. Cl.⁶ .............................................. H04N 1/32
[52] U.S. Cl. .................... 358/468; 358/435; 355/23; 379/100
[58] Field of Search ............... 358/468, 400, 435, 436, 358/401, 405, 496, 498; 355/23, 24

[56] References Cited

U.S. PATENT DOCUMENTS

| | | | |
|---|---|---|---|
| 4,814,798 | 3/1989 | Fukae et al. | 346/160 |
| 4,860,110 | 8/1989 | Kokubu | 358/400 |
| 4,897,831 | 1/1990 | Negi et al. | 370/29 |
| 4,908,719 | 3/1990 | Nonoyama | 358/401 |
| 4,949,189 | 8/1990 | Ohmori | 353/23 |
| 5,057,938 | 10/1991 | Edamura . | |
| 5,124,809 | 6/1992 | Koishikawa | 358/400 |
| 5,157,521 | 10/1992 | Chung | 358/400 |
| 5,282,050 | 1/1994 | Ishizuka et al. | 358/400 |

FOREIGN PATENT DOCUMENTS 2-193156 7/1990 Japan .

Primary Examiner—Edward L. Coles, Sr.
Assistant Examiner—Madeleine A. V. Nguyen
Attorney, Agent, or Firm—Oblon, Spivak, McClelland, Maier & Neustadt

[57] ABSTRACT

A facsimile transmission control method includes first through fifth steps. The first step is storing image information read from a document in an image memory of a transmitting station before a receiving station is called. The second step is receiving a non-standard facilities signal from the receiving station after the receiving station is called. The third step is detecting whether or not the receiving station has a two-sided printing capability, based on the non-standard facilities signal. The fourth step is transmitting a non-standard facilities set-up signal to the receiving station after the non-standard facilities signal is received. The fifth step is transmitting the stored image information from the transmitting station to the receiving station. In this method, when the receiving station has the two-sided printing capability, the receiving station is informed by using the non-standard facilities set-up signal that a two-sided document transmission function is selected in order to transmit the stored image information to the receiving station.

4 Claims, 4 Drawing Sheets

FACSIMILE TRANSMISSION CONTROL METHOD

BACKGROUND OF THE INVENTION

The present invention generally relates to a facsimile transmission control method, and more particularly to a facsimile transmission control method suitable for transmitting a document image from a transmitting station to a receiving station having a two-sided printing capability.

Japanese Laid-Open Patent Publication No.2-193156 discloses a proposed facsimile machine which has a two-sided printing capability. In a recent facsimile machine, a reading unit can automatically read a document image on both front and back sides of paper by using a two-sided document reading capability, and transmits the document image to a receiving station in a manner that a front-side image and a back-side image are alternately transmitted.

The proposed facsimile machine, disclosed in the above mentioned publication, receives a document image from a transmitting station by using the two-sided printing capability, in order for saving recording sheets. In the proposed facsimile machine, the received images are printed alternately on the front side of paper and on the back side according to the sequence of receiving of the images.

Hereinafter, the one-side document reading capability refers to a capability to read a document image on the front side of paper, and the two-sided document reading capability refers to a capability to read document images on both the front side and back side of paper. In addition, hereinafter, the two-sided printing capability refers to a capability to print images on both the front side of paper and the back side one side at a time in the sequence of receiving of the images.

In the above described facsimile machine, however, it is impossible to transmit a document image read at a transmitting facsimile station by the one-side document reading capability to a receiving facsimile station with the two-sided printing capability.

Generally, in a G3 facsimile machine, image information is optically read from a document in the forward direction (from the top of the document to the bottom), and it is transmitted in the forward direction for every page in a manner such that the top end image data is first and the bottom end image data is last. On the other hand, in a conventional facsimile machine with the two-sided printing capability, an image of the front side page is printed in the forward direction and an image of the back side page is printed in the backward direction. Thus, it is necessary for a receiving facsimile station to reverse the direction of printing an image of the back side page (received in the forward direction) prior to the printing, so that an image of the front side page is printed in the non-reversed forward direction and alternately an image of the back side page is printed in the reversed direction.

In a conventional facsimile machine with the two-sided document transmitting capability, when a two-sided document image is transmitted, it is necessary to reverse the direction of transmitting a processed image of the back side page (what is first processed is last out and what is last processed is first out). A processed image of the front side page is transmitted in the forward direction and no reversing procedure is performed. Thus, images of all the pages read from the document image are transmitted in the forward direction.

Therefore, when a two-sided document image is transmitted, the reversing procedures for images of the back side pages are repeatedly performed at a transmitting station before transmission and at a receiving station after transmission. Thus, the transmission cost will be unnecessarily increased.

In order to resolve the above described problem, a facsimile transmission method has been proposed by the inventor of the present invention (see Japanese Patent Application No. 4-44508). In the proposed facsimile transmission method, it is detected whether the transmitting station has the two-sided document transmitting capability, and it is detected whether the receiving station has the two-sided printing capability. When it is detected that both the transmitting and receiving stations have the two-sided capabilities mentioned above, a two-sided document image is transmitted by the transmitting station and printed by the receiving station, and no reversing procedures for images of the back side pages are performed, thereby reducing the transmission cost.

However, the proposed facsimile transmission method functions effectively only when the transmitting station and the receiving station have the two-sided capabilities mentioned above. The proposed facsimile transmission method cannot be applied to a facsimile machine which has the one-side document reading capability with no two-sided capability. Facsimile machines with the one-side document reading capability are less expensive and more widely prevailing than facsimile machines with the two-sided printing capability.

SUMMARY OF THE INVENTION

Accordingly, it is a general object of the present invention to provide an improved facsimile transmission control method in which the above described problems are eliminated.

Another, more specific object of the present invention is to provide a facsimile transmission control method capable of efficiently transmitting a document image from a facsimile machine having the one-side document reading capability to a facsimile machine having the two-sided printing capability.

The above mentioned objects of the present invention can be achieved by a facsimile transmission control method which includes first through fifth steps. The first step is storing image information read from a document in an image memory of a transmitting station before a receiving station is called. The second step is receiving a non-standard facilities signal from the receiving station after the receiving station is called. The third step is detecting whether or not the receiving station has a two-sided printing capability, based on the non-standard facilities signal. The fourth step is transmitting a non-standard facilities set-up signal to the receiving station after the non-standard facilities signal is received. The fifth step is transmitting the stored image information from the transmitting station to the receiving station. In this method, when the receiving station has the two-sided printing capability, the receiving station is informed by using the non-standard facilities set-up signal that a two-sided document transmission function is selected in order to transmit the stored image information to the receiving station.

According to the present invention, it is possible to efficiently carry out a facsimile transmission procedure for transmitting a document image from a transmitting station to a receiving station having the two-sided printing capability.

BRIEF DESCRIPTION OF THE DRAWINGS

Other objects, features and advantages of the present invention will become apparent from the following detailed description when read in conjunction with the accompanying drawings in which.

DESCRIPTION OF THE PREFERRED EMBODIMENT

First, a description will be given of a facsimile system which carries out a facsimile transmission control method according to the present invention with reference to FIG. 2.

Figure 2:
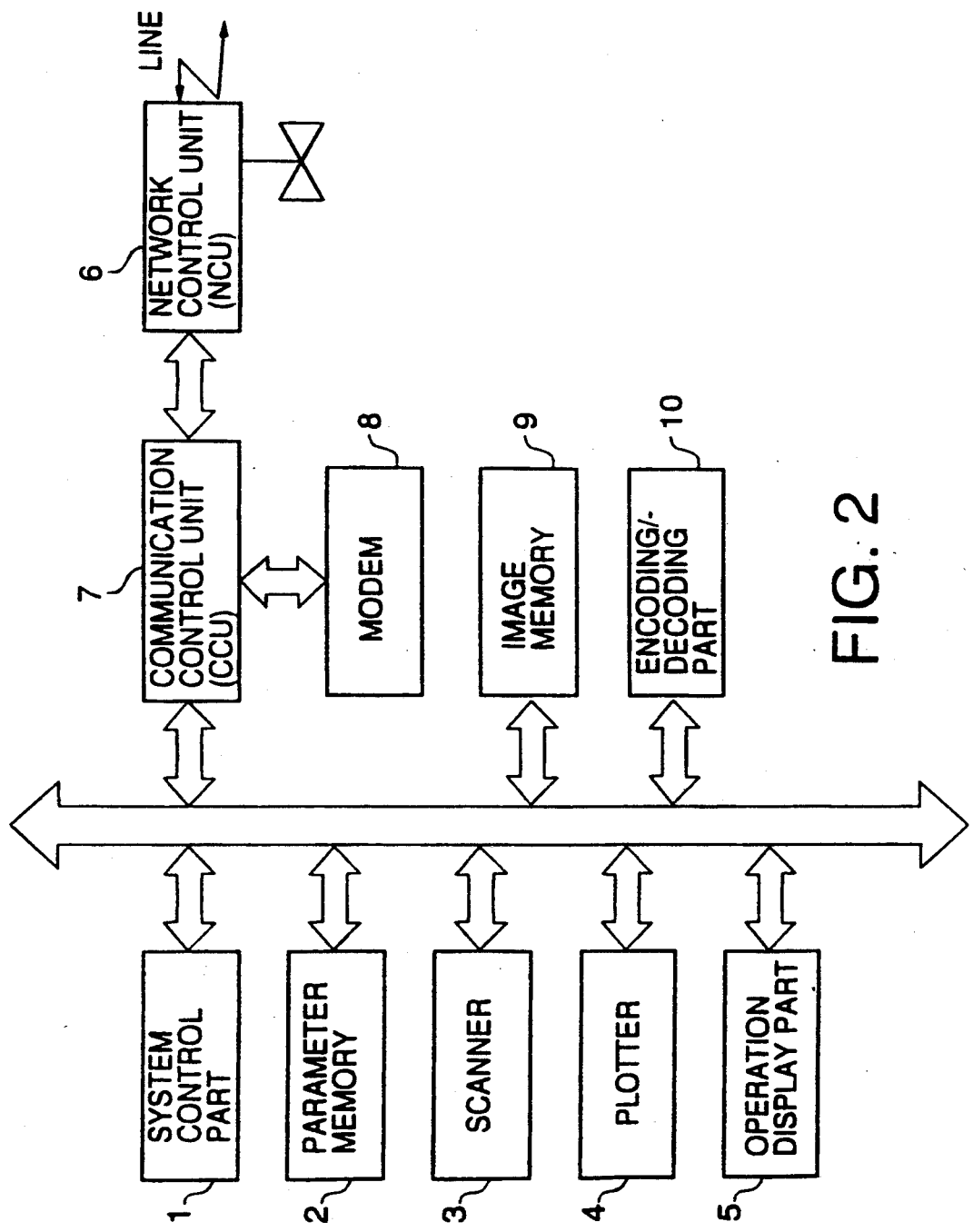
FIG. 2 is a block diagram showing a facsimile system which carries out the facsimile transmission process shown in FIG. 1.

In FIG. 2, a system control part 1 is a main control unit of the facsimile system for controlling operations of component units of the facsimile system. A parameter memory 2 stores control programs and parameters used to carry out several control processes of the facsimile system. The parameters stored in the parameter memory 2 includes a plurality of facsimile numbers of prescribed receiving stations and shortened codes of those facsimile numbers. A scanner 3 optically reads a document image by using the one-side document reading capability.

In FIG. 2, a plotter 4 prints a received document image on paper. An operation display part 5 displays instructions input from an operator, facsimile numbers of calling stations or the like on a display screen thereof. A network control unit (NCU) 6 carries out connecting and disconnecting operations of the facsimile system to an external facsimile station via a transmission line. A communication control unit (CCU) 7 carries out transmitting and receiving of facsimile data to an external facsimile station via the transmission line. A modem 8 converts a signal in the form used within the facsimile system into a signal in the form transmitted on the transmission line. An image memory 9 stores image information to be transmitted to an external facsimile station. An encoding/decoding part 10 compresses image information by encoding the image information read by the scanner 3 prior to the transmission thereof, and decompresses image information by decoding a received image information into image information in the original form.

In the facsimile system shown in FIG. 2, prior to the transmission of a document image, image information read by the scanner 3 is compressed by the encoding/decoding part 10, and the compressed image information is temporarily stored in the image memory 9. The image information stored in the image memory 9 is further compressed by the encoding/decoding part 10, and it is transmitted by the CCU 7 to the transmission line through the NCU 6.

In the standard G3 facsimile communication protocol, a transmitting station TX receives an NSF (non-standard facilities) signal from a called receiving station RX before an image is transmitted. By making use of the NSF signal, the transmitting station TX can detect whether the called receiving station RX has the two-sided printing capability. After the NSF is received, the transmitting station TX sends an NSS (non-standard facilities set-up) signal to the receiving station RX. By making use of the NSS signal, the transmitting station TX informs that image information read by using the one-side document reading capability will be transmitted to the receiving station RX by using the two-sided document transmitting capability. An operator can instruct the transmitting station TX to select the two-sided document transmission by making use of the operation display part 5 shown in FIG. 2.

There are two types of facsimile machines having two-sided printing capability: the direction of printing a back-side image (the forward direction) is the same as the direction of printing a front-side image; and the direction of printing a back-side image (the backward direction) is opposite to the direction of printing a front-side image. By making use of the above described NSF, it is possible for the transmitting station TX to detect which type of the two-sided printing capability the called receiving station RX has.

In addition, there are two types of two-sided document transmitting function: the direction of transmitting a back-side image (the forward direction) is the same as the direction of transmitting a front-side image; and the direction of transmitting a back-side image (the backward direction) is opposite to the direction of transmitting a front-side image. In order to efficiently transmit a two-sided document image, it is necessary that the direction of transmitting of a back-side image by the transmitting station is in accordance with the direction of printing of the back-side image by the receiving station RX. By making use of the above described NSF, it is possible for the transmitting station TX to inform the receiving station RX which type of the two-sided document transmitting function is selected before transmitting the two-sided document image.

The operation of the facsimile system shown in FIG. 2 when it is detected that the direction of printing a back-side image of the receiving station RX is opposite to the direction of printing a front-side image will now be described.

Image information read by the scanner 3 is compressed by the encoding/decoding part 10, and the compressed image information is temporarily stored in the image memory 9. After the NSF is received, the stored image information is decompressed by the encoding/decoding part 10, and the reconstructed image information is again stored in the image memory 9. Then, the stored information of a back-side image is compressed by the encoding/decoding part 10 in the forward direction from the top to the bottom and the stored information of a front-side image is compressed in the backward direction from the bottom to the top, so that such compressed information is transmitted by the CCU 7 to the transmission line through the NCU 6.

Figure 1:
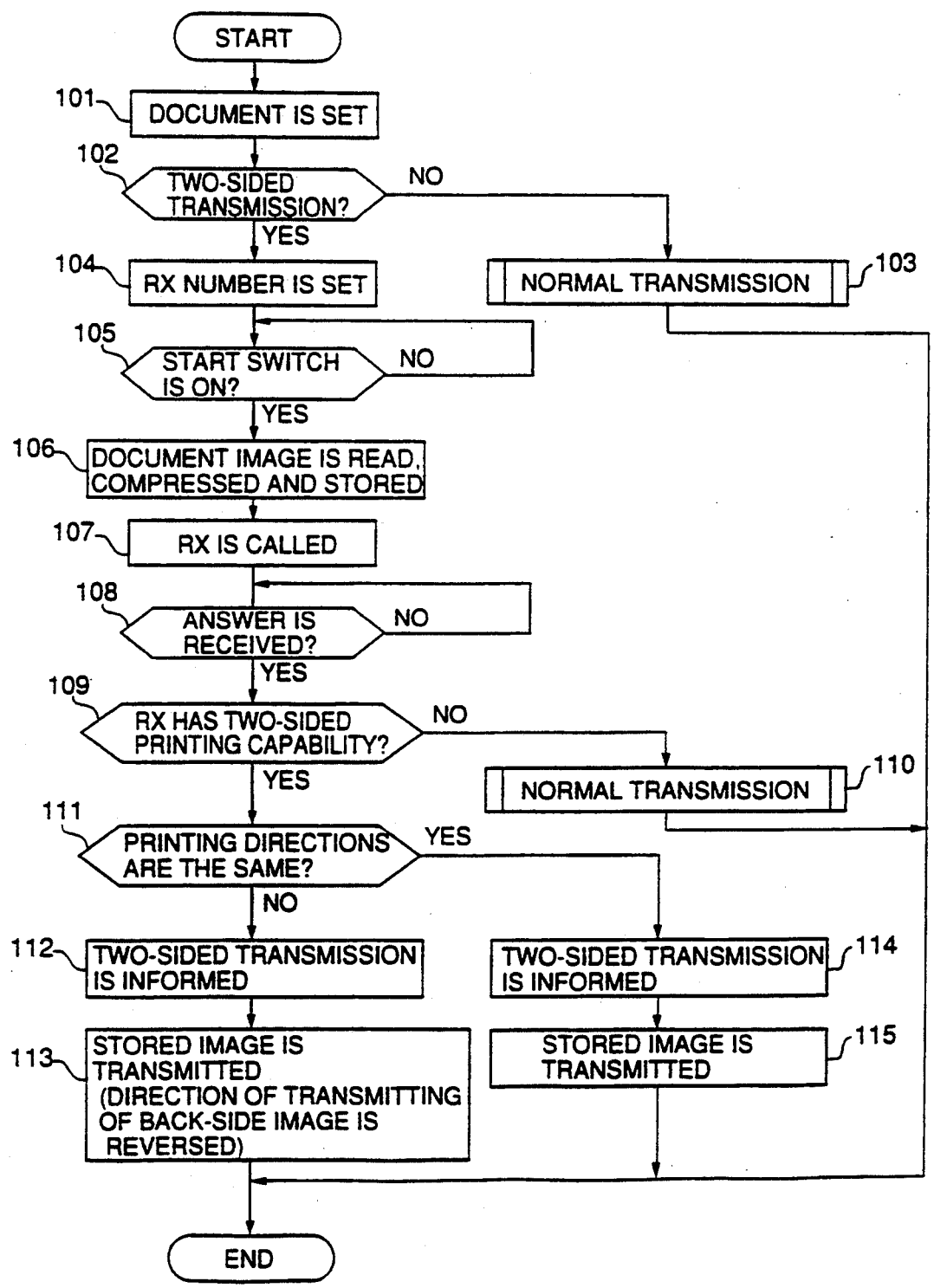
FIG. 1 is a flow diagram for explaining a facsimile transmission process according to the present invention.

Next, a description will be given of a facsimile transmission control method according to the present invention with reference to FIGS. 1 and 2. FIG. 1 shows a facsimile transmission process which is performed by the facsimile system shown in FIG. 2.

In FIG. 1, step 101 sets a document on the scanner 3 to read an image from the document. Step 102 detects whether or not a two-sided document transmission function (which is a non-standard function according to the present invention) is selected by an operator on the operation and display part 5 of the transmitting station TX.

If the answer to step 102 is negative, step 103 is performed, and then the facsimile transmission process ends. Step 103 performs a normal transmission process in which a one-side document image is transmitted. If the answer to step 102 is affirmative, step 104 is performed. In step 104, the operator inputs a facsimile number of the receiving station from the operation display part 5.

After step 104 is performed, step 105 detects whether or not a start switch is depressed to start the reading of the document by the scanner 3. The facsimile system is in a waiting condition until the start switch is depressed.

After the start switch is depressed in step 105, step 106 is performed. In step 106, a document image is optically read by the scanner 3, and the document image is compressed by the encoding/decoding part 10, and the compressed information is stored in the image memory 9.

After step 106 is completed, step 107 is performed. In step 107, the receiving station RX is called with the input facsimile number. Step 108 detects whether or not an answer signal such as the NSF is received from the called receiving station RX. The facsimile system is in a waiting condition until the answer signal is received.

After the answer to step 108 is affirmative, step 109 is performed. In step 109, by making use of a received NSF signal, it is detected whether or not the receiving station RX has the two-sided printing capability. If the answer to step 109 is negative (the RX has no two-sided printing capability), step 110 is performed, and then the facsimile transmission process ends. In step 110, the normal, one-side document transmitting process is performed.

If the answer to step 109 is affirmative (the RX has the two-sided printing capability), step 111 is performed. In step 111, by making use of the received NSF signal, it is detected whether or not the direction of printing of a back-side image is the same as the direction of printing of a front-side image.

If the answer to step 111 is affirmative, steps 114 and 115 are performed. In step 114, by making use of an NSS signal, the transmitting station TX informs the receiving station RX that the two-sided document transmitting function is selected to transmit the stored image information to the RX. After step 114 is performed, step 115 transmits the image information stored in the image memory 9 to the receiving station RX via the transmission line. In step 115, the image information of both the front-side and the back-side images is transmitted in the forward direction from the top to the bottom.

If the answer to step 111 is negative, steps 112 and 113 are performed. In step 112, by making use of the NSS signal, the transmitting station TX informs the receiving station RX that the two-sided document transmitting function is selected to transmit the stored image information. After step 112 is performed, step 113 transmits the image information stored in the image memory 9 to the receiving station RX via the transmission line. In step 113, the image information of a back-side image is transmitted in the backward direction (from the bottom to the top) and the image information of a front-side image is transmitted in the forward direction (from the top to the bottom). Thus, the direction of transmitting of a back-side image by the transmitting station TX is in accordance with the direction of printing of the back-side image by the receiving station RX.

Therefore, according to the above described facsimile transmission control method, it is possible to efficiently transmit a document image from a transmitting station to a receiving station having the two-sided printing capability even when the transmitting station is an inexpensive, widely used facsimile machine having the one-side document reading capability only.

Next, a description will be given of the facsimile communication protocol used by the facsimile system shown in FIG. 2, with reference to FIG. 3.

Figure 3:
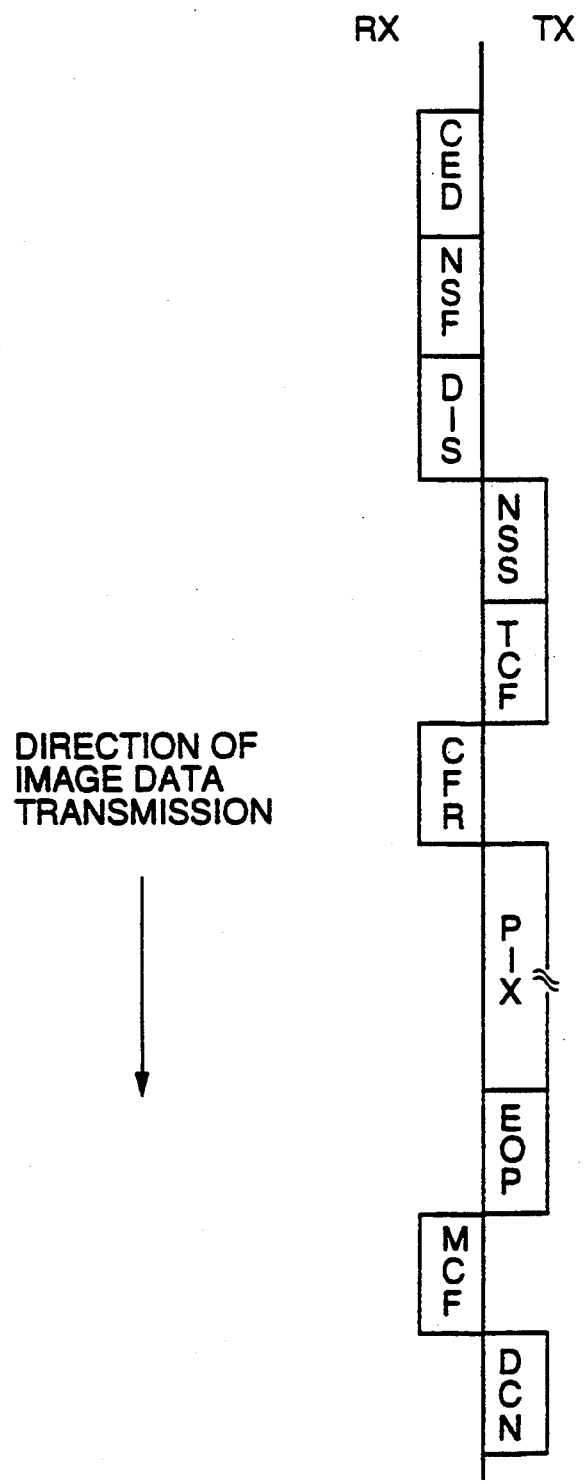
FIG. 3 is a diagram showing a standard facsimile communication protocol used by the facsimile system shown in FIG. 2.

As shown in FIG. 3, when a receiving station RX is called from a transmitting station TX, answer signals such as CED (called station identification), NSF (non-standard facilities) and DIS (digital identification signal) are sent from the RX to the TX. In the facsimile transmission control method according to the present invention, the data contained in the NSF signal is utilized so that the TX can detect the specific functions of the RX prior to the document transmission. As described above, the transmitting station TX can detect whether the RX has the two-sided printing capability, and can detect whether the direction of printing of a back-side image of the receiving station RX is the same as the direction of printing of a front-side image.

After the answer signals from the RX are received by the TX, signals such as NSS (non-standard facilities set-up) and TCF (training confirmation) are sent from the TX to the RX. In the facsimile transmission control method according to the present invention, the data contained in the NSS signal is utilized so that the TX can inform the RX, prior to the document transmission, that the two-sided document transmitting function is selected.

After the signals such as NSS and TCF from the TX are received by the RX, a signal such as CFR (confirmation to receive) is sent by the RX to the TX so that the allowance of the transmission is informed. After the CFR signal is received by the TX, the TX transmits the image information (which is indicated by "PIX" in FIG. 3) to the RX via a transmission line.

As described above, when it is detected based on the received NSF that the direction of printing of a back-side image is opposite to the direction of printing of a front-side image, the image information of a back-side image is transmitted by the TX in the backward direction.

When the transmittion of the image information is completed, the transmitting station TX sends an EOP (end of procedure) signal to the receiving station RX. If the EOP signal is in the receiving station RX, the end of the transmission procedure is indicated.

In response to the EOP signal from the TX, the RX sends an MCF (message confirmation) signal to the TX, so that it is informed that the image information transmitted from the TX is correctly received. Finally, in response to the MCF signal from the RX, the TX performs a disconnection (DCN) procedure so that the facsimile system is disconnected from the transmission line.

Next, the directions of printing used by a receiving station when image information including a front-side image and a back-side image is transmitted from a transmitting station will be described with reference to FIGS. 4A and 4B.

Figure 4A:
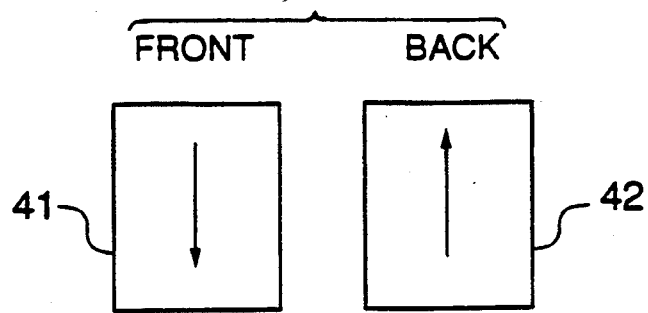
FIGS. 4A and 4B are diagrams for explaining two printing directions used by a receiving station when a document image is transmitted from a transmitting station thereto.

FIG. 4A shows the directions of printing of a front-side image and a back-side image used when the receiving station has the two-sided printing capability and the direction of printing of a back-side image 42 (the backward direction) is opposite to the direction of printing of a front-side image 41 (the forward direction). As described above, in the facsimile transmission control method of the present invention, the front-side image 41 is transmitted in the forward direction and the back-side image 42 is transmitted in the backward direction from the TX to the RX.

Figure 4B:
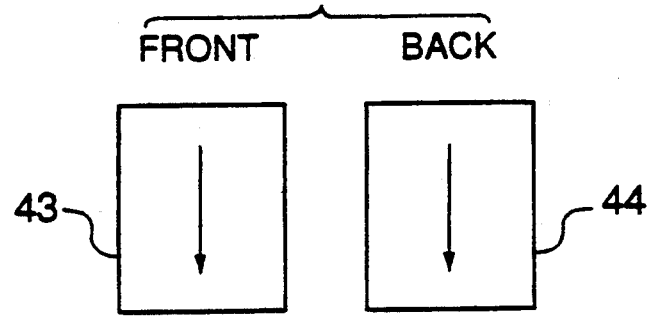

FIG. 4B shows the directions of printing of a front-side image 43 and a back-side image 44 used when the receiving station RX has no two-sided printing capability or when the RX has the two-sided printing capability but the direction of printing of a back-side image is the same as the direction of printing of a front-side image. In the above described facsimile transmission control method of the present invention, both the front-side image 43 and the back-side image 44 are transmitted in the forward direction from the TX to the RX.

Accordingly, the direction of transmitting of image information by the TX is always in accordance with the direction of printing of the image information by the RX. It is unnecessary for the RX to reverse the direction of printing of a back-side image.

Further, the present invention is not limited to the above described embodiment, and variations and modifications may be made without departing from the scope of the present invention.

What is claimed is:

1. A facsimile transmission method for transmitting a document image from a transmitting station to a receiving station having a two-sided printing capability via a transmission line, said method comprising the steps of:

storing image information read from a document in an image memory of the transmitting station before the receiving station is called;

calling the receiving station by the transmitting station;

receiving a non-standard facilities signal from the receiving station after the receiving station is called;

detecting whether or not the receiving station has a two-sided printing capability which prints images on both a front side and a back side of a same page, using said non-standard facilities signal received in said receiving step;

detecting whether the direction of printing of a back-side image used by the two-sided printing capability of the receiving station is the same as or opposite to the direction of printing of a front-side image, based on said non-standard facilities signal;

transmitting a non-standard set-up signal to the receiving station after said non-standard facilities signal is received; and transmitting said stored image information from the transmitting station to the receiving station, wherein when the receiving station has the two-sided printing capability, said receiving station is informed by using said non-standard facilities set-up signal that a two-sided document transmission function is selected in order to transmit the stored image information to the receiving stations.

2. A method according to claim 1, wherein when said step of detecting the direction of printing detects that the direction of printing of a back-side image used by the two-sided printing capability of the receiving station is opposite to the direction of printing of a front-side image, the direction of transmitting of a back-side image contained in said stored image information is reversed so as to be in accordance with the direction of printing of the back-side image by the receiving station such that the transmission of the back-side images contained in said stored image information starts from a bottom line of each of the back-side images and ends at a top line of each of the back-side images.

3. A method according to claim 1, wherein when said step of detecting the direction of printing detects that the direction of printing of a back-side image used by the two-sided printing capability of the receiving station is the same as the direction of printing of a front-side image, the direction of transmitting of a back-side image contained in said stored image information is in accordance with the direction of printing of the back-side image by the receiving station such that the transmission of the back-side images contained in said stored image information starts from a top line of each of the back-side images and ends at a bottom line of each of the back-side images.

4. A method according to claim 1, wherein when the direction of printing of back-side pages is detected to be opposite to the direction of printing of front-side pages, said stored image information is decompressed into reconstructed image information and said reconstructed image information is again stored in the image memory, and first stored information, corresponding to each of the back-side pages contained in said stored image information, is compressed in a forward direction from a top line thereof to a bottom line thereof while second stored image information, corresponding to each of the front-side pages contained in said stored image information, is compressed in a backward direction from a bottom line thereof to a top line thereof, so that the compressed image information is transmitted from the transmitting station to the receiving station.

* * * * *